(12) United States Patent
Kim et al.

(10) Patent No.: US 7,061,562 B2
(45) Date of Patent: Jun. 13, 2006

(54) PATTERNED VERTICALLY ALIGNED LIQUID CRYSTAL DISPLAY

(75) Inventors: Kyeong-Hyeon Kim, Kyungki-do (KR); Kye-Hun Lee, Kyungki-do (KR); Seung-Beom Park, Kyungki-do (KR); Jang-Kun Song, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 114 days.

(21) Appl. No.: 10/430,412

(22) Filed: May 7, 2003

(65) Prior Publication Data

US 2003/0206262 A1 Nov. 6, 2003

Related U.S. Application Data

(63) Continuation of application No. 09/417,076, filed on Oct. 13, 1999, now Pat. No. 6,577,366.

(30) Foreign Application Priority Data

Oct. 13, 1998 (KR) ............................................ 98-42709

(51) Int. Cl.
*G02F 1/13* (2006.01)

(52) U.S. Cl. ...................................... 349/129; 349/130
(58) Field of Classification Search .................. 349/129, 349/130
See application file for complete search history.

(56) References Cited

U.S. PATENT DOCUMENTS

| | | | |
|---|---|---|---|
| 5,309,264 A | 5/1994 | Lien et al. | |
| 5,745,195 A | 4/1998 | Zhang | 359/39 |
| 5,880,794 A * | 3/1999 | Hwang | 349/39 |
| 5,886,756 A * | 3/1999 | Lee | 349/39 |
| 6,014,189 A * | 1/2000 | Budd et al. | 349/39 |
| 6,104,461 A * | 8/2000 | Zhang et al. | 349/122 |
| 6,133,967 A * | 10/2000 | Moon | 349/39 |
| 6,229,589 B1 | 5/2001 | Koma | 349/139 |
| 6,545,730 B1 * | 4/2003 | Hwang | 349/43 |

FOREIGN PATENT DOCUMENTS

EP 0 669 549 A1 8/1995

OTHER PUBLICATIONS

F.C. Luo, "Active Matrix LC Displays", pp. 397–408; published 1990.

* cited by examiner

*Primary Examiner*—James Dudek
(74) *Attorney, Agent, or Firm*—McGuireWoods LLP

(57) ABSTRACT

In a vertically aligned mode LCD, a gate line and a storage line are formed on a substrate in parallel, and a storage electrode and a cover pattern are formed as branches of the storage line. The storage electrode is overlapped with an aperture of a common electrode formed on an upper substrate. The cover pattern is located between a pixel electrode and a data line to prevent a light leakage. Accordingly, an alignment error margin of the upper substrate and the lower substrate is increased, an aperture ratio is enhanced, and repairing the high pixel defect is possible. Further, the light leakage caused by a voltage of the data line is prevented.

15 Claims, 6 Drawing Sheets

FIG.3
FIG.4
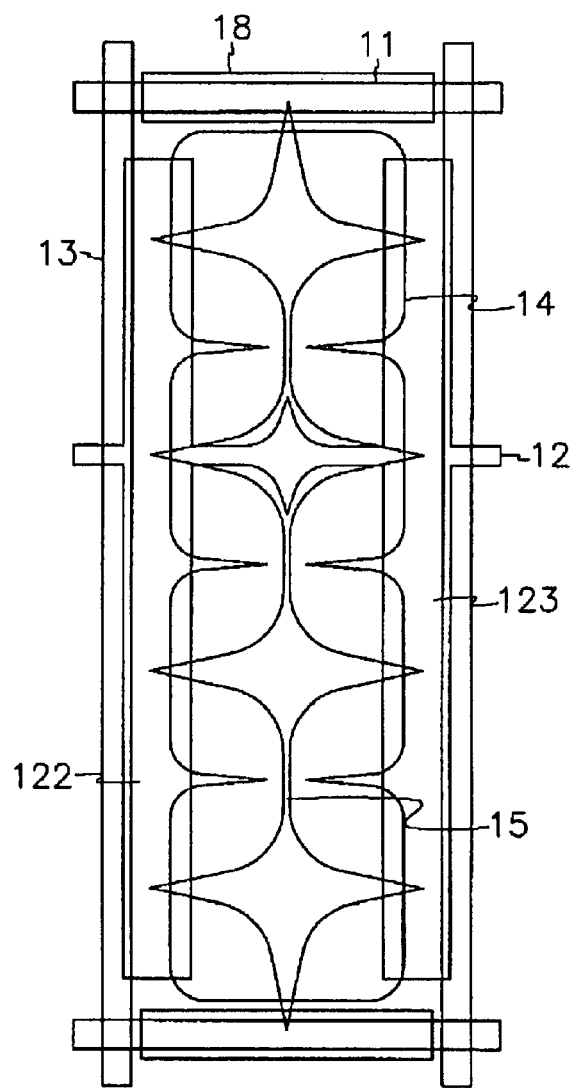
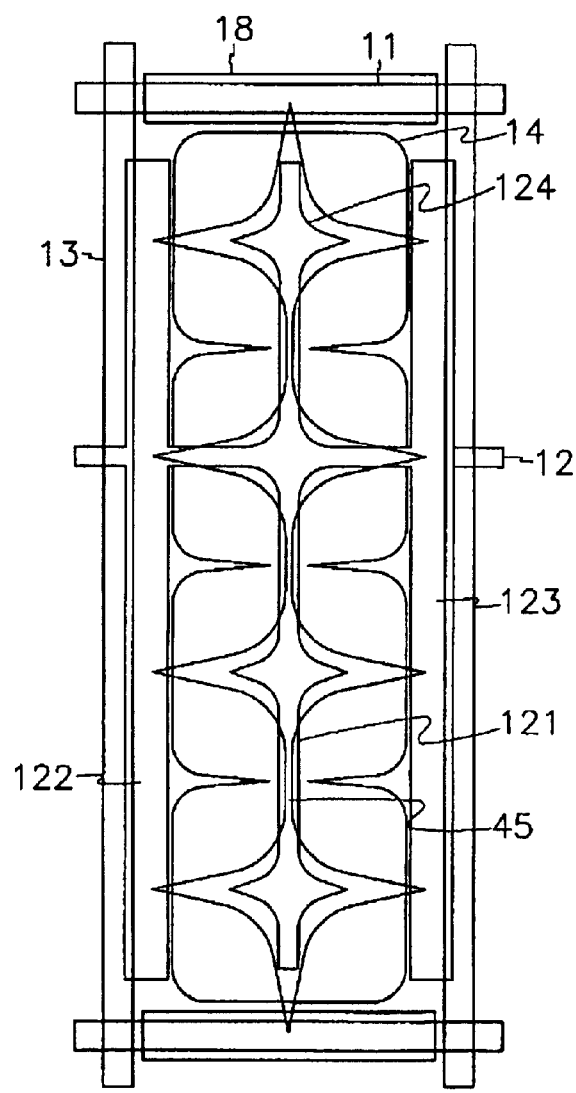

FIG.5
FIG.6
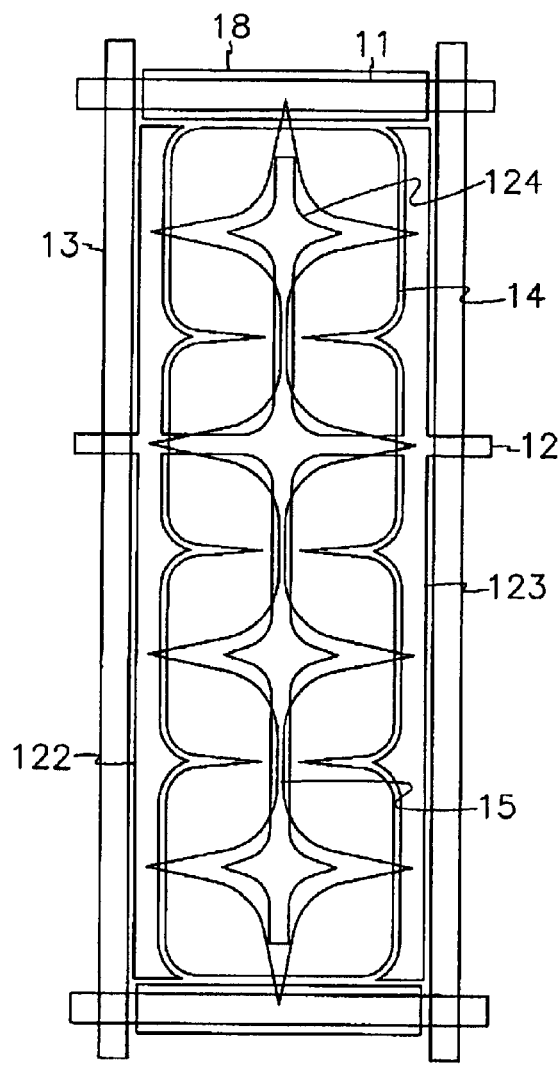
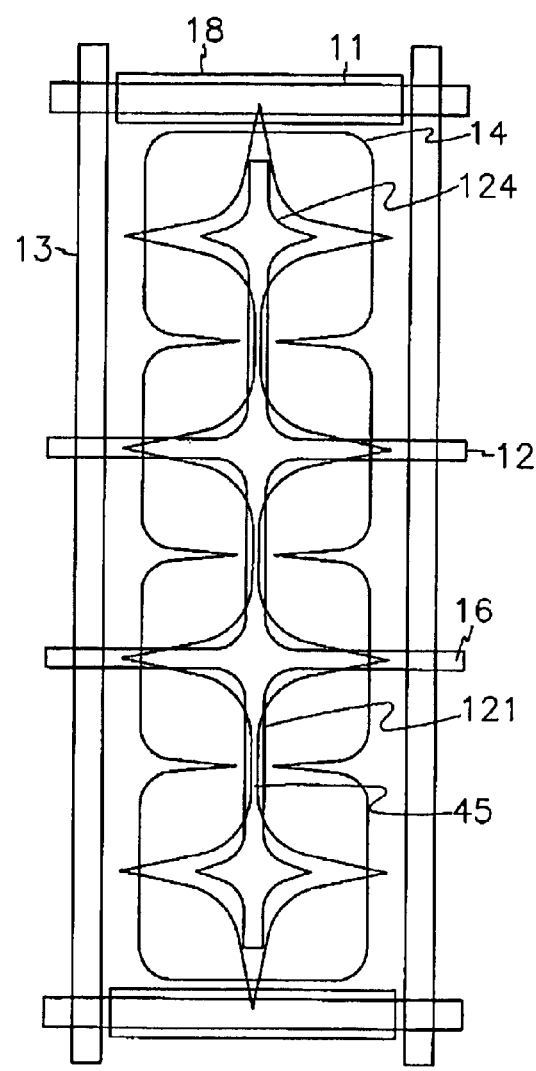

FIG.7
FIG.8
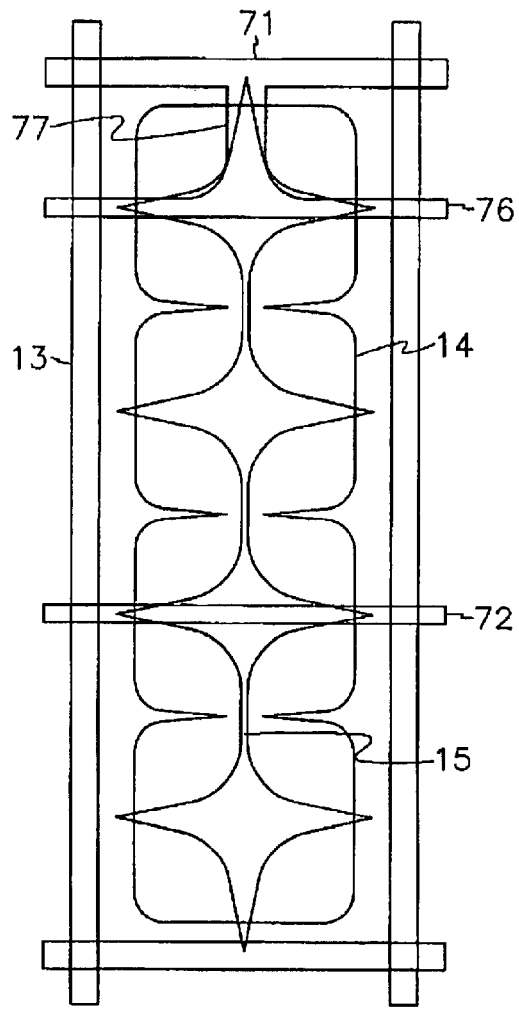
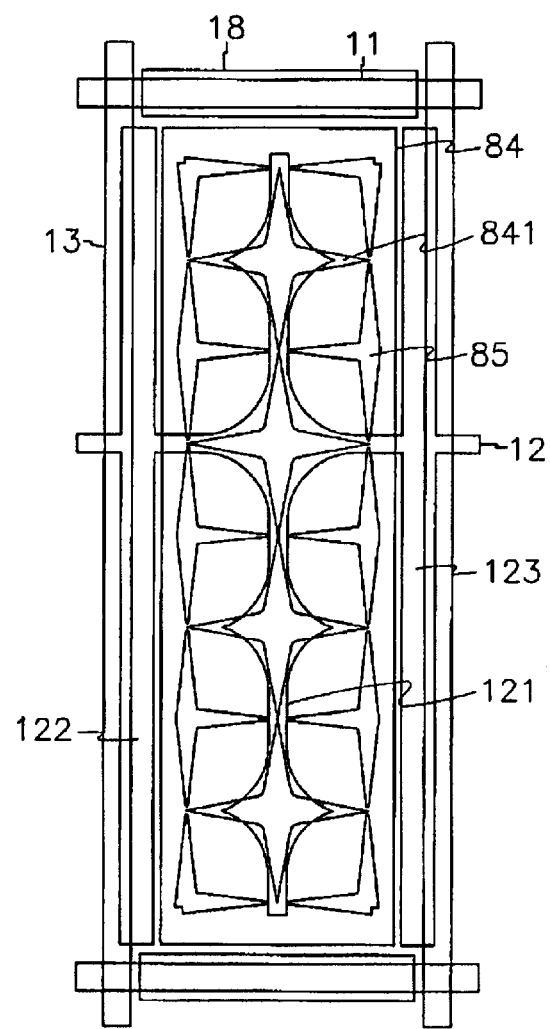

PATTERNED VERTICALLY ALIGNED LIQUID CRYSTAL DISPLAY

This application is a continuation application of co-pending U.S. application Ser. No. 09/417,076, filed on Oct. 13, 1999, which has now become U.S. Pat. No. 6,577,366 B1.

BACKGROUND OF THE INVENTION (a) Field of the Invention

The present invention relates to a liquid crystal display having a wide viewing angle, and more particularly, to a liquid crystal display of which viewing angle is made wide by patterning apertures in electrodes.

(b) Description of the Related Art

Liquid crystal displays (LCDs) typically include two substrates and a liquid crystal layer interposed between the substrates. The transmittance of light is controlled by the intensity of an electric field applied to the liquid crystal layer.

In a vertically aligned (VA) mode LCD, liquid crystal molecules take on a homeotropic orientation in which long axes of the molecules are perpendicular to the substrate. This configuration cuts off lights almost completely in an "off" state where an electric field above a certain value is not applied to the liquid crystal layer. In the normally black mode, since brightness in the off state is extremely low, a significantly higher contrast ratio can be obtained when compared to the conventional twisted nematic LCDs. However, in an "on" state, in which an electric field above a certain value is applied between the electrodes, a tilt direction of the liquid crystal molecules is irregular such that a direction of the long axes of some liquid crystal molecules becomes identical to a polarizing direction of either an upper or a lower polarizer film. When this occurs, the liquid crystal molecules are unable to rotate the polarizing direction of light, thereby blocking the light with the polarizer films. These parts of the LCD appear black, degrading the picture quality. To solve this problem, many methods of patterning electrodes are proposed. In U.S. Pat. No. 5,136,407, a method of forming line-shaped apertures on electrodes of one of the two substrates is disclosed. In U.S. Pat. No. 5,309,264, there is disclosed a method of forming "X"-shaped apertures on transparent electrodes of one of the two substrates.

In order to maintain a storage capacitance, either storage lines or gate lines are used. In the latter case, an aperture formed at a pixel above a gate may form an electric field between the gate line and a common electrode and leak lights by moving the liquid crystal material, when a voltage is applied to the gate line. This limits the design of the apertures of the electrodes. Accordingly, it is hard to design an electrode pattern that allows a bigger margin for pixel alignment. Further, in a ring gate structure, it frequently causes a high pixel defect, which leaves pixels continuously in a white state as a result of shorting the pixel electrodes with the data lines or the gate lines. This problem is difficult to repair. Finally, an aperture ratio is low since light can not be transmitted in the areas where the gate lines are formed.

SUMMARY OF THE INVENTION

The present invention has been made in an effort to solve the above problems.

It is an object of the present invention to provide an electrode pattern design which enables a bigger margin for pixel alignment.

It is another object of the present invention to provide a method for repairing high pixel defects.

It is yet another object of the present invention to increase an aperture ratio.

A liquid crystal display according to the present invention includes a first gate line formed on a lower substrate, a first storage line formed on the lower substrate, a data line formed on the lower substrate crossing and insulated from the first gate line and the first independent line, a pixel electrode formed on the lower substrate crossing and insulated from the first storage line, and a common electrode formed on an upper substrate with an aperture dividing the pixel electrode into a plurality of sections. The outer boundary of the pixel electrode is rugged and the aperture formed on the common electrode has various shapes depending on the aspects of the present invention.

The storage line may have storage electrodes and/or cover patterns to increase a storage capacitance.

The cover patterns may overlap the adjacent pixel electrodes or data lines. Or they may just follow the boundaries of the pixel electrodes and data lines to keep a uniform distance between them.

BRIEF DESCRIPTION OF THE DRAWINGS

Further objects and other advantages of the present invention will become apparent from the following description in conjunction with the attached drawings, in which:

FIGS. 2 to 9 are partial plan views of LCDs according respectively to second to ninth embodiments of the present invention.

DETAILED DESCRIPTION OF THE PREFERRED EMBODIMENTS

Figure 1A:
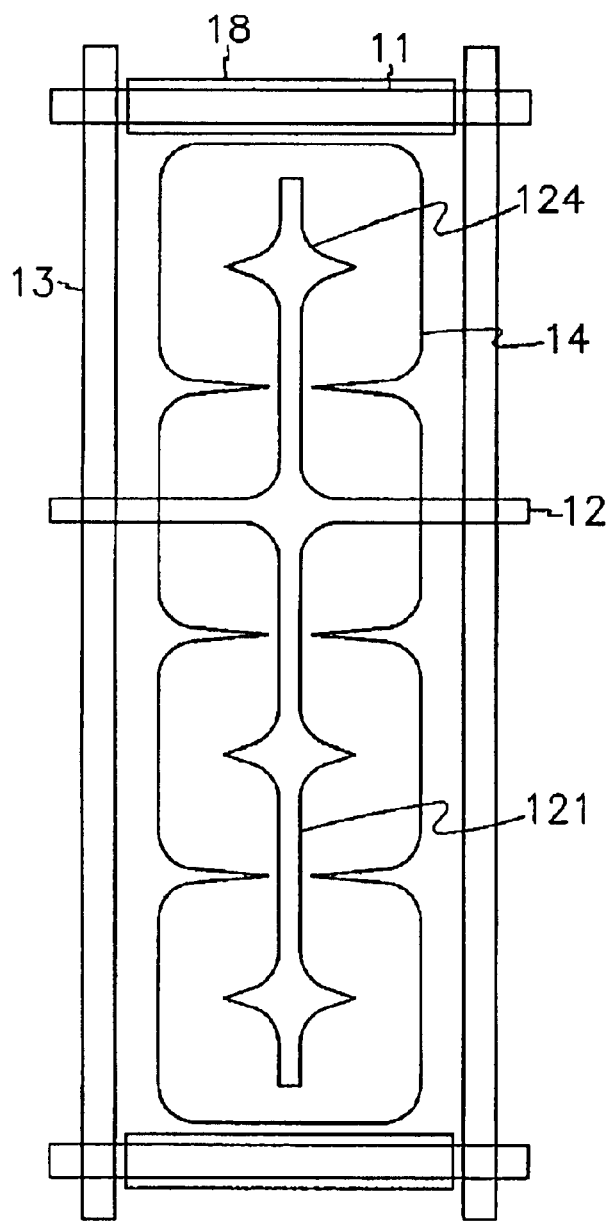
FIGS. 1A and 1B are partial layout views respectively of a lower panel and an aperture formed on an upper panel of a liquid crystal display (LCD) according to a first embodiment of the present invention.

The present invention now will be described more fully hereinafter with reference to the accompanying drawings, in which preferred embodiments of the invention are shown. This invention may, however, be embodied in many different forms and should not be construed as limited to the embodiments set forth herein. In the drawings, the thickness of layers and regions are exaggerated for clarity. Like numbers refer to like elements throughout. It will be understood that when an element such as a layer, region or substrate is referred to as being "on" another element, it can be directly on the other element or intervening elements may also be present. In contrast, when an element is referred to as being "directly on" another element, there are no intervening elements present.

Figure 1B:
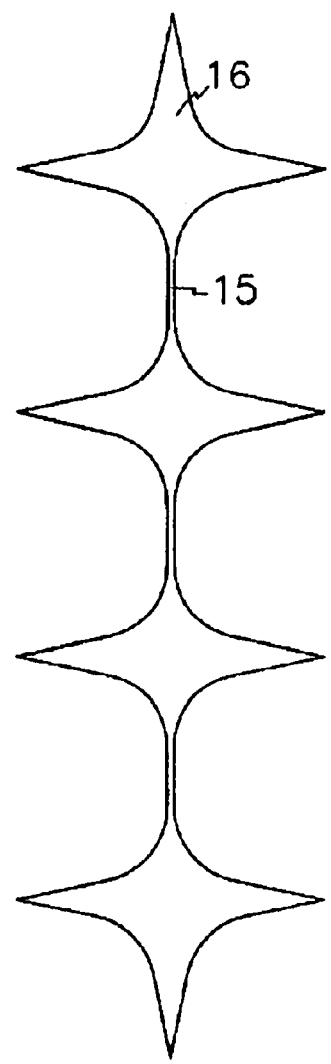
Figure 1C:
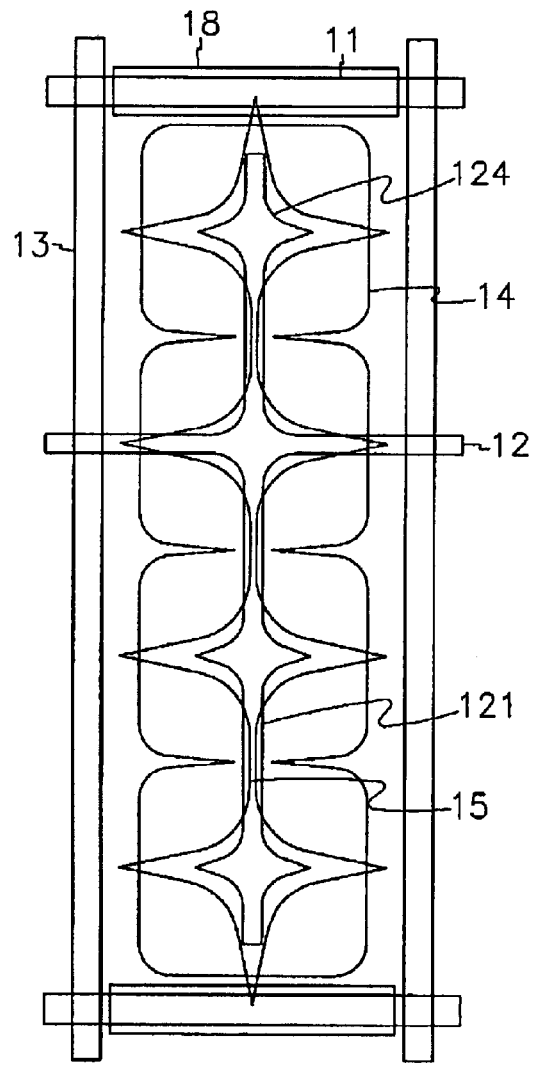
FIG. 1C is a partial plan view of an LCD according to the first embodiment of the present invention.

FIGS. 1A, 1B and 1C are partial layout views respectively of a lower substrate of a liquid crystal display (LCD), an aperture formed on an upper substrate of an LCD, and the two substrates in an assembled state according to a first embodiment of the present invention. It is to be assumed that elements appearing in the drawings are provided over an entire surface of the substrates, and not just once or twice as shown in the drawings.

As shown in FIG. 1A, gate lines 11 and a storage line 12 extend in one direction on the lower substrate. A storage electrode 121 is formed perpendicular to the gate lines 11 and the storage line 12, the storage electrode 121 being branched from the storage line 12. The storage electrode 121 has projections 124 that are formed outwardly from the storage electrode 121 in a direction opposite to a longitudinal axis of the storage electrode 121. Adjacent projections 124 are formed at a uniform distance from each other. Although the storage line 12 comes to have the same potential as that of common electrodes, which are formed on the upper substrate, the storage line 12 may also have a different potential. Further, when enough storage capacitance is made by the storage line 12, the storage electrode 121 need not be formed. It is preferable that the gate lines 11, the storage line 12 and the storage electrode 121 are formed simultaneously by a single photolithography process on the lower substrate.

Data lines 13, which are insulated from the gate lines 11 and the storage line 12, are formed perpendicular to the gate lines 11 and the storage line 12. A plurality of pixel electrodes 14, which are insulated from the storage electrode 121, is formed in a pixel area defined by the gate lines 11 and the data lines 13 (i.e., each pair of gate lines 11 and data lines 13 forms a pixel area). The pixel electrodes 14 are substantially square with rounded corners The longitudinal axis of the storage electrode 121 passes through the center of the pixel electrodes 14, and the projections 124 of the storage electrode 121 are located at the center of the square-shaped pixel electrodes 14. The pixel electrodes 14 may be made of ITO (indium tin oxide) for transmitting-type LCDs, and made of aluminum (Al) for reflection-type LCDs.

Redundant gate lines 18 are formed on the gate lines 11 and between the data lines 13. The redundant gate lines 18 are used to repair gate lines 11 in the event the gate lines 11 become disconnected. If one of the gate lines 11 becomes disconnected, the two severed ends are shorted with the corresponding redundant gate line 18 using a laser. The redundant gate lines 18 may be provided in the LCD after its two ends are pre-connected to the gate lines 11. The redundant gate line 18 may be formed on the same layer and of the same material as either the data lines 13 or the pixel electrodes 14.

FIG. 1B shows an aperture 15 that is formed on a common electrode of the upper substrate. The aperture 15 includes a plurality of shapes 16 that extends outward on both sides of the aperture 15 in a direction opposite to a longitudinal axis of the aperture 15. The shapes 16 extend a predetermined distance and become increasingly narrow toward ends of the shapes 16 to form a point at the ends of the shapes 16. The aperture 15 is formed in such a manner to make boundaries of the aperture 15 smooth since such smooth boundaries make an arrangement of liquid crystal molecules more uniform and have the liquid crystal molecules response quicker. This is also why the pixel electrodes 14 are formed with rounded edges. Accordingly, whatever shape the pixel electrodes 14 and aperture 15 may take, it is preferable that the boundaries of the aperture 15 and the pixel electrodes 14 be a straight line, or a curve with an obtuse angle.

FIG. 1C shows the upper substrate and the lower substrate when they are assembled. When assembled, the storage line 12 overlaps a longitudinal axis of one of the shapes 16 of the aperture 15. The remaining shapes 16 overlap the projections 124 of the storage electrode 121 such that a center of the shapes 16 corresponds to a center of the projections 124. As a result, the substantially square shape of the pixel electrodes 14 is divided into four sections. At this time, it is preferable that outer edges of the pixel electrodes 14 and areas of the pixel electrodes 14 outlined by the aperture 15 make a closed loop, thereby forming a plurality of sections in each pixel electrode 14. Also, it is preferable that long axes of the liquid crystal molecules in one section of the pixel electrodes 14 defined by the shapes 16 of the aperture 15 are arranged at a 90° angle (on average) to long axes of the liquid crystal molecules in an adjacent section of the pixel electrodes 14. If the pixel electrode 14 is formed as a perfect square, and the polarizing films are perpendicularly arranged, the long axes of the liquid crystal molecules in each of the sections of the pixel electrodes 14 are arranged at a 45° angle against the polarities of the polarizing films when viewed from above. Accordingly, a wide viewing angle may be obtained.

As described above, since the storage electrode 121 is connected to the storage line 12, a common voltage may be applied to the storage electrode 121. Accordingly, no electric field is formed between the storage electrode 121 and the common electrode. Therefore, no lights leak even when apertures are formed above the storage electrode 121.

Further, since there is no gate ring, restrictions in forming aperture patterns are significantly reduced. Therefore, as described above, it is possible to form the aperture 15 having a plurality of shapes 16 on the common electrode of the upper substrate, and the plurality of connected pixel electrodes 14 having a substantially square shape with its edges rounded. As a result, an error margin in a photolithography process to form the aperture 15 is increased. Furthermore, the boundaries of the sections of the pixel electrodes 14 formed as a closed loop reduce the uneven textures, in which the liquid crystal molecules are arranged unevenly, in each of the sections of the pixel electrodes 14. In addition, since the aperture 15 may be formed large enough to leave some length after fully dividing the pixel electrodes 14 into the sections, even if the lower and upper substrates are somewhat misaligned when assembling, the boundaries of the sections of the pixel electrodes nevertheless form a closed loop. In other words, a bigger alignment error margin can be obtained.

Also, the storage electrode 121 formed where the aperture 15 overlaps, which normally appears black as a result of the weak electric field, minimizes a reduction in the aperture ratio to maintain storage capacitance.

Finally, a high pixel defect may be converted into a low pixel defect, which is less problematic than the high pixel defect, by shorting the pixel electrode 14 causing the problem to the storage line 12 by a laser melting process. Next, the shorted portions between the pixel electrode 14 and the gate line 11 or the data line 13 are cut using the laser melting process.

Figure 2:
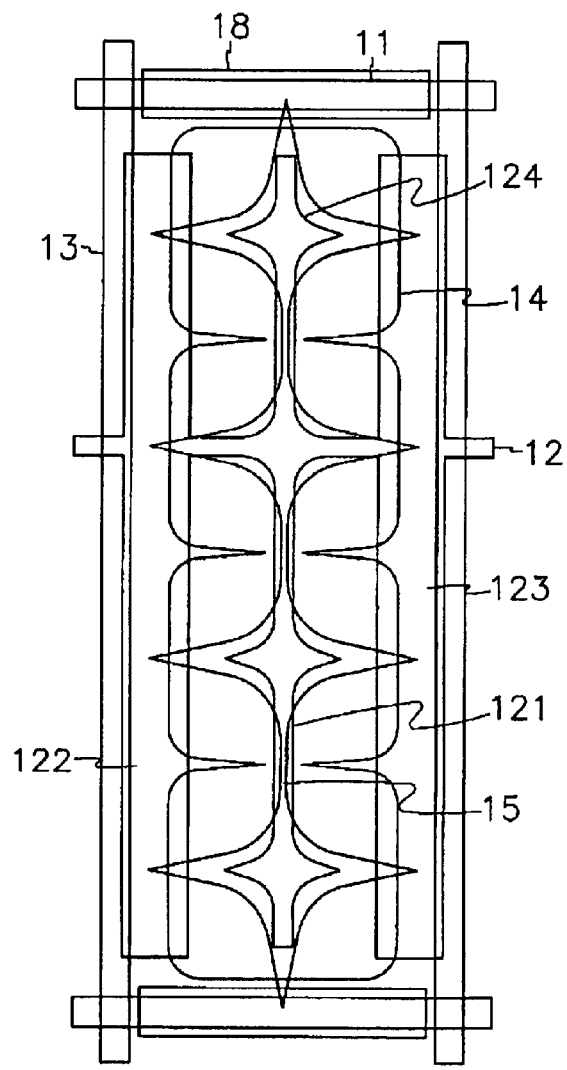

FIG. 2 is a partial plan view of an LCD according to a second embodiment of the present invention.

In the second embodiment, the first cover pattern 122 and the second cover pattern 123, which are connected to the storage line 12, are additionally provided. These cover patterns are preferably made of the same material and at the same time as the gate lines and the storage lines. The first cover pattern 122 and the second cover pattern 123 preferably are provided partially covering the pixel electrodes 14 and the data lines 13 in an identical direction with the data lines 13. The first cover pattern 122 and the second cover pattern 123 ends before contacting the gate lines 11. The first cover pattern 122 and the second cover pattern 123 overlap with a part of the data lines 13 to increase a capacitance formed between the cover patterns 122 and 123 and the data lines 13.

The cover patterns 122 and 123 decrease the electric field between the data lines 13 and the common electrode to prevent the liquid crystal molecules from reacting to the electric field between the data lines 13 and the common electrode. Furthermore, the cover patterns 122 and 123 act as a black matrix and minimize the leakage of light. Also, the cover patterns 122 and 123 increase storage capacitance.

FIG. 3 is a partial plan view of an LCD according to a third embodiment of the present invention.

The third embodiment is the same as the second embodiment except that the storage electrode 121 is removed.

When the storage line 12 and the cover patterns 122 and 123 can obtain enough storage capacitance, the aperture ratio is increased by not forming the storage electrode 121.

FIG. 4 is a partial plan view of an LCD according to a fourth embodiment of the present invention. The fourth embodiment is the same as the second embodiment except that the cover patterns 122 and 123 do not overlap any part of the pixel electrodes 14.

This can eliminate large variances in storage capacitance even if a misalignment occurs between a photo shot for forming the cover patterns 122 and 123 and a photo shot for forming the pixel electrodes 14. Accordingly, stitch defects are prevented.

FIG. 5 is a partial plan view of an LCD according to a fifth embodiment of the present invention.

The fifth embodiment is the same as the fourth embodiment except that boundaries of the cover patterns 122 and 123 are curved to roughly correspond to the curves in the boundaries of the pixel electrodes 14. Accordingly, a uniform distance is maintained between the cover patterns 122 and 123 and the pixel electrodes 14.

This makes the electric field formed between the cover patterns 122 and 123 and the pixel electrodes 14 uniform. Therefore, this uniform electric field affects the electric field formed between the pixel electrodes 14 and common electrodes, symmetrically in all the sections of the pixel electrodes 14 defined by the aperture 15.

FIG. 6 is a partial plan view of an LCD according to a sixth embodiment of the present invention.

The sixth embodiment is the same as the first embodiment except that a second storage line 16 is additionally formed on the storage electrode 121. The second storage line 16 is formed in place of one of the projections 124 and is parallel with the first storage line 12. The second storage line 16 is formed on the same layer as the first storage line 16. The number of storage lines 12 and 16 may be further increased. The second storage line 16 is provided as a fail-safe. That is, this configuration enables the LCD to be driven even if one of the two storage lines 12 and 16 is disconnected.

FIG. 7 is a partial plan view of an LCD according to a seventh embodiment of the present invention.

A first gate line 71 and a second gate line 76 are formed on the substrate, and a connector 77 connects the two gate lines 71 and 76. It is preferable that the second gate line 76 overlaps the aperture 15, which is formed in the common electrode of the upper substrates such that the aperture ratio is not reduced. A storage line 72 that overlaps the aperture 15 is formed in parallel with the gate lines 71 and 76. Other elements of the LCD are identical in structure with those of the first embodiment shown in FIG. 1C.

The storage capacitance is obtained by the second gate line 76 and the storage line 72 is provided to repair the high pixel defect.

FIG. 8 is a partial plan view of an LCD according to an eighth embodiment of the present invention.

In the eighth embodiment, there is a pixel electrode 84 having a first aperture 841. The first aperture 841 is formed in the shape of connected crosses (+) which are aligned in a line and having widths that narrow in a direction away from a center of each cross. A common electrode has a second aperture 85 formed in the shape of a square ring, sides of which are cut at its center and which are narrowed in a direction toward the center of the sides. The remaining elements are identical in structure with those described in the first embodiment, and the first cover pattern 122 and the second cover pattern 123 are the same as those of the fourth embodiment.

The storage electrode 121 is formed to overlap the first aperture 841 that originally appears as a black area. Accordingly, the aperture ratio need not be reduced to form a storage capacitance. The cover patterns 122 and 123 decrease the electric field between the data lines 13 and the common electrode to prevent liquid crystal molecules from reacting to the electric field between the data lines 13 and the common electrode. Furthermore, the cover patterns 122 and 123 act as a black matrix and minimize the light leakage. Also, the cover patterns 122 and 123 increase storage capacitance. At this time, a second storage line (not shown) connected to the first storage line 12 through the storage electrode 121 may be additionally formed on the same layer as, and in parallel with, the first storage line 12. Further, the first aperture 841 and the second aperture 85 may be formed in other shapes.

Figure 9:
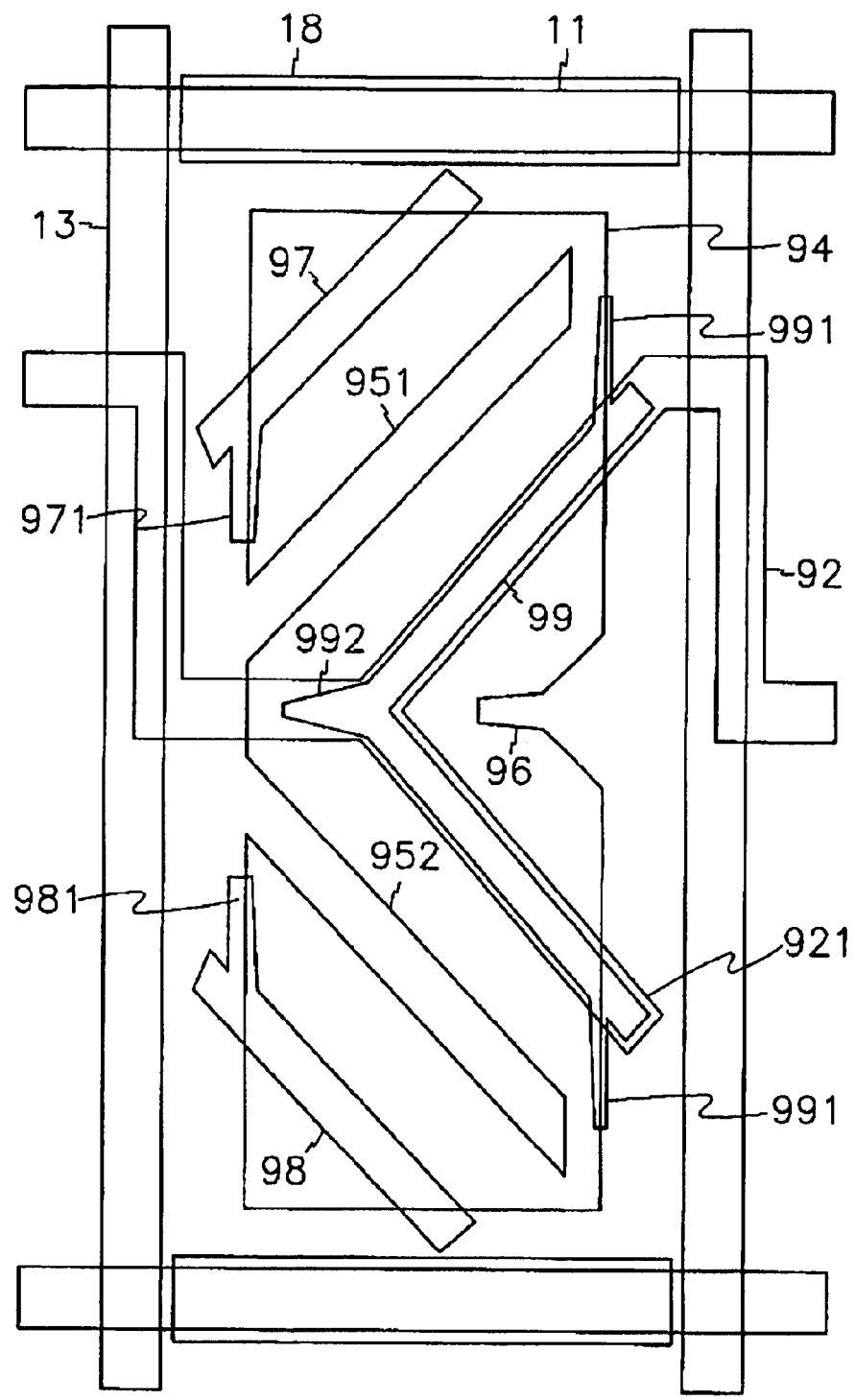

FIG. 9 is a partial plan view of an LCD according to a ninth embodiment of the present invention.

The gate line 11, the data line 13 and the redundant gate line 18 are identical in structure with those of the first embodiment. However, aperture patterns of the pixel electrode 94 and the common electrode are different from the first embodiment, and the shape of a storage line 92 is also different from the storage line 12 of the first embodiment.

A first bottom aperture 951 and a second bottom aperture 952 extending through the pixel electrode 94 obliquely from a left boundary to approximately a right boundary of the pixel electrode are formed symmetrically with regard to the center of the pixel electrode. A third bottom aperture 96 extends into the pixel electrode 94 horizontally a predetermined distance from the right boundary. The distance between the first bottom aperture 951 and the second bottom aperture 952 progressively increases in a direction from the left boundary to the right boundary. A storage line 92 is formed on the same layer as the gate line 11 and overlaps the pixel electrode 94. The independent line 92 is not straight but rather angled and has a branch 921.

A first top aperture 97 and a second top aperture 98 extending obliquely and symmetrically to each other, and a third top aperture 99 angled at a mid point are formed on the common electrode. The third top aperture 99 is equidistant from the first and second top apertures 97 and 98. The first top aperture 97 and the second top aperture 98 respectively have vertical branch apertures 971 and 981 extended in a vertical direction (FIG. 9). The third top aperture 99 has two vertical branch apertures 991 extending in the vertical direction at both ends, and a horizontal branch aperture 992 protruding in the horizontal direction at the mid point. At this time, the vertical branch apertures 971, 981, and 991 overlap boundaries of the pixel electrode 94.

When assembled, the pixel electrode aperture pattern 951, 952 and 96 and the common electrode aperture pattern 97, 98, 99, 971, 981, 991 and 992 are alternately arranged. The storage line 92 overlaps the third top aperture 99, and the branch 921 also overlaps the third top aperture 99.

As described above, an LCD according to the present invention increases the alignment error margin of the upper and lower substrates and the aperture ratio. Also, the high pixel defect can be repaired, and the light leakage problem caused by the data line voltage is prevented.

In the drawings and specification, typical preferred embodiments of the present invention have been disclosed. Although specific terms are employed, they are used in a generic and descriptive sense only and not for purposes of limitation, the scope of the invention being set forth in the following claims.

What is claimed is:

1. A liquid crystal display, wherein a long axis of a liquid crystal molecule is arranged in perpendicular to a substrate when electric field is not applied, comprising:
   a gate line formed on a lower substrate;
   a storage line formed on the lower substrate;
   a data line formed on the lower substrate crossing and insulated from said gate line and said storage line;
   a pixel electrode formed on the lower substrate crossing and insulated from said storage line;
   a common electrode formed on an upper substrate and having an aperture pattern dividing said pixel electrode into a plurality of sections;
   a first storage electrode connected to said storage line, said first storage electrode overlapping alongside said pixel electrode; and
   a second storage electrode connected to said storage line, said second storage electrode formed corresponding to the aperture pattern.

2. The liquid crystal display of claim 1, wherein the second storage electrode comprises a projection.

3. The liquid crystal display of claim 2, wherein the projection is formed corresponding to the aperture pattern.

4. The liquid crystal display of claim 3, wherein the projection is concentric with said aperture pattern.

5. A liquid crystal display, wherein a long axis of a liquid crystal molecule is arranged in perpendicular to a substrate when electric field is not applied, comprising:
   a gate line formed on a lower substrate;
   a storage line formed on the lower substrate;
   a data line formed on the lower substrate crossing and insulated from the gate line;
   a pixel electrode formed on the lower substrate crossing and insulated from the storage line;
   a common electrode formed on an upper substrate and having an aperture pattern dividing the pixel electrode into a plurality of sections; and
   a storage electrode connected to the storage line and formed corresponding to the aperture pattern.

6. The liquid crystal display of claim 5, further comprising a redundant gate line located on the gate line and between two adjacent data lines.

7. The liquid crystal display of claim 6, wherein the redundant gate line is located on the same layer and made of the same material as the data line.

8. The liquid crystal display of claim 6, wherein the redundant gate line is located on a same layer and made of the same material as the pixel electrode.

9. The liquid crystal display of claim 6, wherein the redundant gate line is connected to the gate line through contact holes.

10. The liquid crystal display of claim 5, wherein said storage electrode is concentric with the aperture pattern.

11. A liquid crystal display, wherein a long axis of a liquid crystal molecule is arranged in perpendicular to a substrate when electric field is not applied, comprising:
    a first gate line formed on a lower substrate;
    a second gate line that is parallel to the first gate line;
    a connector connecting the first gate line and the second gate line;
    a storage line formed on the lower substrate;
    a data line formed on the lower substrate crossing and insulated from the first gate line and the first storage line;
    a pixel electrode formed on the lower substrate crossing and insulated from the first storage line;
    a common electrode formed on an upper substrate and having an aperture pattern dividing the pixel electrode into a plurality of sections; and
    a storage electrode connected to the storage line and formed corresponding to the aperture pattern.

12. A liquid crystal display, wherein a long axis of a liquid crystal molecule is arranged in perpendicular to a substrate when electric field is not applied, comprising:
    a gate line formed on a lower substrate;
    a storage line formed on the lower substrate;
    a data line formed on the lower substrate crossing and insulated from the gate line and the storage line;
    a pixel electrode formed on the lower substrate crossing and insulated from the storage line and having a first aperture pattern;
    a common electrode formed on an upper substrate and having a second aperture pattern; and
    a storage electrode connected to the storage line and formed corresponding to the aperture pattern,
    wherein the first aperture pattern includes a first bottom aperture and a second bottom aperture oblique with respect to the gate line and symmetric to each other,
    the second aperture pattern including a first top aperture and a second top aperture oblique with respect to the gate line and symmetric to each other,
    the first aperture pattern and the second aperture pattern are arranged alternately.

13. The liquid crystal display of claim 12, wherein a redundant gate line is located on the gate line between two adjacent data lines.

14. The liquid crystal display of claim 12, further including a branch electrode connected to the storage line and overlapping the second aperture pattern.

15. The liquid crystal display of claim 12, wherein the second aperture pattern includes branch apertures overlapping boundaries of the pixel electrode.

* * * * *